Feb. 8, 1927.  1,617,241
R. A. FESSENDEN
METHOD AND APPARATUS FOR THE TRANSMISSION OF ENERGY BY
HIGH FREQUENCY IMPULSES
Filed Aug. 21, 1922
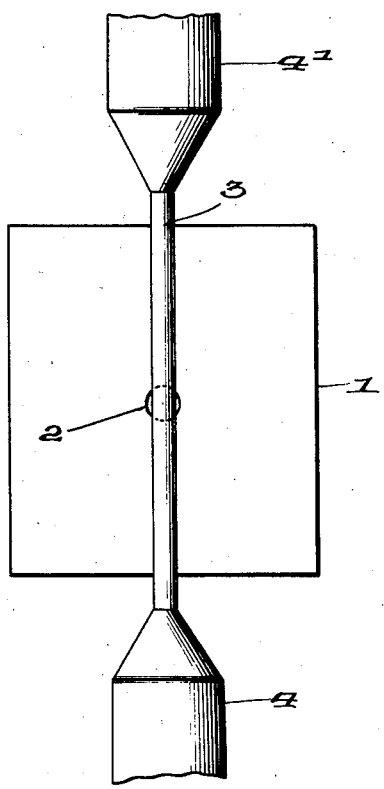
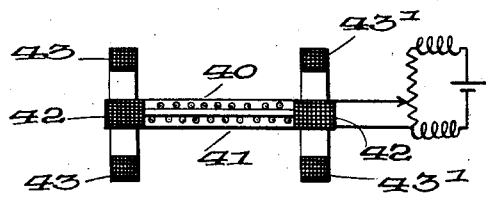
Inventor
Reginald A. Fessenden.
By
Attorney Patented Feb. 8, 1927.                                    1,617,241

UNITED STATES PATENT OFFICE.

REGINALD A. FESSENDEN, OF CHESTNUT HILL, MASSACHUSETTS.

METHOD AND APPARATUS FOR THE TRANSMISSION OF ENERGY BY HIGH-FREQUENCY IMPULSES.

Application filed August 21, 1922. Serial No. 583,271.

My invention relates to the transmission and reception of energy by high frequency impulses, and more particularly to the transmission of images by short electric waves, more particularly to the transmission of vision by short electric waves by wire or wireless, and still more especially to radio telescopes.

The object of this invention is to improve the efficiency of such transmission, and to disclose methods and apparatus adapted to accomplish the same, and to eliminate the effective disturbing impulses, and more particularly to the means of modulating the light (visual or ultra or infra visible) for producing the images at the receiving end.

Figures 1 and 2 show means adapted for carrying out my invention.

The transmission of images by wire is well known, and descriptions will be found in the "Scientific American" and other papers in the decade 1880–1890 of the successful transmission of such pictures by Grey (by his telautograph and by other methods) and by Bain (by his electro-chemical method), between New York and Boston and Chicago, etc., and such pictures were transmitted wirelessly by applicant, using the Grey telautograph, between Brant Rock and Plymouth, in 1907 and 1908, by the methods shown in U. S. Patent No. 1,015,881, December 19, 1906.

The transmission time of the above methods was measured in minutes or fractions of a minute, and consequently, they were entirely incapable of transmitting vision, i. e. acting as a telescope, since, to produce the effect of vision, ten images, or even more, must be transmitted and reproduced per second.

Means for accomplishing this were described by applicant in U. S. Patent No. 1,015,881. December 19, 1906, above referred to, but while practicable, the apparatus was complicated and costly, and had other commercial disadvantages.

Applicant discovered from his work done on the subject of the radio telescope, in the years 1901–1910, that there were two fundamental difficulties to be overcome.

The first was a suitable modulator at the receiving end for controlling the light there, so as to form there the visual image.

The second was a suitable light modulated device at the transmitting end for modulating the optical view into electrical impulses for transmission.

A suitable form of light modulated device was invented, and is disclosed in U. S. Patent No. 1,133,435, February 9, 1914, and tests, giving the sensibility of same as fourteen hundred (1400) times that of previous photo-electric effect cells, and demonstrating the entire absence of lag or fatigue in response, will be found in an article by Professor Crewe in the "Physical Review" for December 1926.

Other devices have since been invented, some of which form the subject matter of divisional cases from the present parent application.

A suitable, practical, and efficient light modulating device for the receiving end was also invented, and is described herewith.

The fundamental difficulty of the problem of inventing a light modulating device for the receiving end, is that the number of modulations per second must be of the order of one hundred thousand (100,000) per second or more. If a good sharp process print in a well illustrated book or magazine be examined, it will be seen that the number of small picture elements, i. e. dots of varying intensity is approximately fifty (50) per linear inch, i. e. two thousand five hundred (2,500) per square inch. To form a picture three and one quarter inches by four and one quarter inches (3¼"x4¼"), the usual size of a small photograph, there must, therefore, be approximately thirty thousand (30,000) picture elements or dots of modulated strength, i. e. thirty thousand modulations.

With the present methods, such a picture, is transmitted in about fifteen (15) seconds or more, and, consequently, the modulating apparatus need only be able to modulate at the rate of two thousand (2,000) modulations per second.

If, however, instead of transmitting a picture, we wish to transmit vision, this three and one quarter inch by four and one quarter inch image must be repeated at least ten (10) times a second, instead of once in every fifteen (15) seconds, and this means that there must be thirty thousand (30,000) multiplied by ten (10), or three hundred thousand (300,000) modulations per second. This is, of course of an entirely different order of physical magnitude from the two thousand (2,000) modulations required to transmit pictures, and it is because no means had been known of accomplishing modulation at such a high rate, that, until applicant's success, it had never been done.

It is, of course, possible to create modulations in light at a very high rate of speed, for example, by the use of a neon tube, which, as shown in one of applicant's wireless patents of 1907, may be modulated many hundred thousands of times per second. But if a neon tube be used, it is impossible to focus or form a beam of light from the tube, because any focusing means must, by optical laws, be hundreds of times greater in size than the source of light, i. e. the tube, in order to give sharp definition. Hence, only extremely blurred images can be obtained by such means.

It is true that applicant has invented a form of neon gas illuminator, by using a highly compressed neon in quartz tube, preferably in combination with other elements, but this is not described or claimed here, being described and claimed in another application.

Moreover, applicant has found that such a type of light modulator is not adapted for use in private houses in receiving broadcast moving pictures, baseball games, and the like, while the modulator herein described is admirably so adapted.

As a result of many years of experiment, applicant discovered that the gold wire film galvanometer invented by him in 1892 may be used as a flexible shutter for modulating the admission of light from any suitable source, such as a pointolite lamp, owing to a remarkable property, discovered by applicant, which this gold wire has, in that, when it is made extremely small, the ratio of the current which it will carry, and, therefore, the force acting on it to move it sideways when located in a strong magnetic field, compared to its mass, which has to be moved from side to side, when acting as a shutter, increases enormously. For example, such a gold wire, one ten thousanths of a inch in diameter, of which nine hundred (900) must be twisted together to make the size of a single hair, will carry, without melting, four (4) milliamperes of current. This is at the rate of four hundred thousand (400,000) amperes per square inch, or more than one hundred (100) times as much as large gold wires would carry. Consequently, such a minute gold wire can be driven from side to side by the action of the electric modulating currents about four hundred (400) times faster than a large wire could.

In addition, owing to the small size of the wire, it can be placed in a much more intense magnetic field than a large wire can.

In practice, applicant has operated such a wire as a shutter for modulating the light at the receiving end four hundred (400) times per second, with the current of less than half a milliampere, and in a field of only ten thousand (10,000) lines per square inch, and the amount of modulation was very much in excess of that necessary. These tests are being confirmed by other engineers, for example, by Mr. Price and Dr. Pickard, and, as a result of the experiments, it has been found that modulations of one million (1,000,000) per second may be easily obtained, and that the limit of modulation is about five million (5,000,000) per second.

As the gold wire is not oxidizable, and the sidewise displacement necessary for modulation is such a small fraction of the length of the wire, that there is no possibility of elastic fatigue, the shutter is and has proved a permanent and satisfactory method of accomplishing all that is desired, and even more than is desired, in the way of modulation.

Even with only three hundred thousand (300,000) modulations per second, a screen picture six and one half by eight and one half feet (6½'x8½') will be obtained, giving at twenty feet the same sharpness of definition as good process prints. In fact, the sharpness is really greater, because the smallest object which can be seen by the human eye subtends an angle of one minute of arc, which, at the normal focal distance of ten inches is one three hundredths of an inch (1/300") in diameter, and this is in a stationary field, and not a moving one, and with perfect contrast. In process prints, where the field is fixed, but the contrast is not perfect, as it is in a line drawing in black and white, areas as large as one fiftieth inch (1/50") in diameter are found to give very satisfactory results. Where the picture is a moving one, even larger areas are found satisfactory. In addition, with applicant's arrangement, the definition is improved over the process print, for the reason that the continuous modulation of the transmitted impulses, in accordance with the varying intensities of success of small picture areas, gives the effect of much sharper definition.

Gold wire of such small diameter as one ten thousandth of a inch (1/10,000") was never known until applicant, in 1916, undertook its manufacture, and with the aid of the Baker Platinum Company, of Newark, New Jersey, successfully produced perfectly rounded and uniform wires of this diameter, and smaller.

This gold wire, as drawn, is covered with a sheath of silver, about one thousandth (1/1000") of an inch in thickness, which is dissolved off electrically in twenty percent (20%) pure nitric acid, leaving the thin gold core, which forms the shutter.

Figure 1 shows the shutter, where 1 is an opaque diaphragm, for example, of metal, coated with platinum black, or of black quartz, or other equivalent opaque material. 2 is a small hole drilled in the diaphragm 1. 3 is the fine gold wire and 4, 4' are the enlarged ends where the silver has not been dissolved off.

This shutter or light modulator is placed in a strong magnetic field, whose lines are perpendicular to the plane of the paper, and the modulating electrical current impulses passes in at 4, and flowing through the wire 3, and out at 4', deflect the wire 3, to right and to left, and vary the amount of projected light passing through the opening 2 out of the screen, and thereby produce the varying intensity of illumination needed.

In Figure 2, in place of a single wire, two rows of fine wires are used, with the spaces between the wires of one row opposite to the wires of the other row, so that when placed in the path of the projected beam, no light, or only a predetermined amount, can pass through, the grids 40, 41 being placed in the magnetic field of the coil 42 (a permanent magnetic field may be used, if desired), so that when a current is passed through the wires of the grids, the wires of each grid will move in opposite directions and let the light through. If this current is the light modulated current from the transmitting station, the amount of light let through will correspond to the illumination of a successful small picture area of the transmitting or observing station.

A predetermined amount of light may be allowed to pass through the shutter in the absence of, or independent of, the modulating current, by passing an auxiliary direct current or alternating current through the wires of the grids, and by adjusting the current, as shown in the magnetizing coil 42, and by tilting the grids sideways to each other.

When the light from the projector strikes the grids, the wires expand, and to take the slack out of the wires, an additional magnetic field, generated by the coils 43, 43, is used, which tightens the wires without disturbing their alignment, and, in fact, making it more stable. In order to utilize fully the shutter and to heat all wires uniformly the projector 30 may be fitted with cylindrical, in addition to spherical, lenses, and a cross cylindrical, or other suitable combination of cylindrical and spherical lens, is used to reform the image, if desired, after the beam has passed through the shutter.

As the grids act, to some extent, as a spectroscope and give rise to other diffraction phenomena, they are made adjustable as to distance by means of wedges, the distance being varied till the operation is most satisfactory. It will be found that by proper adjustment, the efficiency of the shutter may be made several times greater than that corresponding to the size of the wires used. The usual heat screen may be used between projector and shutter, and the grids may be in hydrogen or vacuum.

While this form of cratophote has been found suitable, other forms may be used, for example the devices shown in applicant's U. S. Patents 1,044,637, July 14, 1905; and 1,045,781, June 16, 1908. For example, Figure 3 of the former may be actuated by the modulating current to move a grid of wires, or a piece of glass or mica having alternate transparent and opaque portions, or to rotate a mirror and so throw the projector light away from or through the opening through which the light passes to the screen; and this opening may itself be fitted with a grid and the mirror may have the silvering or platinizing in strips, like a grid, so that a very small motion of the mirror about its axis will throw the light through the opening to the screen, or shut it off.

A further important advantage of this form of shutter, when used in this connection, is the fact that the light transmitted through the shutter is a multiple valued function of the current; for as the current increases, the wires of the two grids are brought in line, one behind the other, and the light passed is then a maximum. If the current be still further increased, the wires begin to pass each other, shutting off the light, more and more, until the wires of one grid are now opposite the spaces of the other grid, and the light is a minimum. If the current be still further increased, the light passed increases again, and reaches a second maximum, and so on i. e. the indication is a multiple valued function of the actuating impulses. This multiple valued relation of impulse to effect has the very important and hitherto unsuspected property that it greatly diminishes, in fact practically eliminates, all injurious effects of atmospheric and other disturbing impulses in transmitting pictures, and signals, of all kinds. For if, in projecting a radio-movie of a distant scene, a strong atmospheric impulse occurs, there will be no intensely bright flash of light on the screen to disturb the eye and spoil the rest of the picture by irradiation, after effect and the like. But on the contrary it will be as apt to reduce the intensity of the luminosity of the small picture area affected as to increase it; i. e. the result will be a grey unit area instead of at worst a white or dark area, and there will be no injurious irradiation or after effect, etc. And similarly for other types of signals, for example, telegraphic signals.

What I claim is:

1. In the art of transmitting vision, i. e., of transmitting images successively and with a time interval between successive images not substantially greater than the time of persistence of optical vision, a modulating shutter for modulating the intensity of the illumination of the elements of the transmitted vision, consisting of a thin flexible metallic strip actuated by the vision modulated currents transmitted from the sending end.

2. In the art of transmitting vision, i. e., of transmitting images successively and with a time interval between successive images not substantially greater than the time of persistence of optical vision, a modulating shutter for modulating the intensity of the illumination of the elements of the transmitted vision, consisting of a thin flexible metallic strip actuated electrically by the vision modulated currents transmitted from the sending end.

3. In the art of transmitting vision, i. e., of transmitting images successively and with a time interval between successive images not substantially greater than the time of persistence of optical vision, a modulating shutter for modulating the intensity of the illumination of elements of the transmitted vision, consisting of a thin flexible strip of gold carrying and actuated by the vision modulated currents transmitted from the sending end.

4. In the art of transmitting vision, i. e., of transmitting images successively and with a time interval between successive images not substantially greater than the time of persistence of optical vision, a modulating shutter for modulating the intensity of the illumination of transmitted elements of the vision consisting of, as a movable element, a thin gold wire substantially one ten thousandths of an inch in diameter, or less.

5. In the art of transmitting vision, i. e., of transmitting images successively and with a time interval between successive images not substantially greater than the time of persistence of optical vision, a modulating shutter for modulating intensity of the illumination of elements of the transmitted vision, consisting of a conducting wire substantially one ten thousandths of an inch in diameter or less, and actuated by the vision modulated current transmitted from the sending end.

6. In the art of transmitting vision, i. e., of transmitting images successively and with a time interval between successive images not substantially greater than the time of persistence of optical vision, a modulating shutter for modulating intensity of the illumination of elements of the transmitted vision consisting of a plurality of conducting wires, substantially one ten thousandths of an inch in diameter or less, and actuated by the vision modulated currents transmitted from the sending end.

7. In the art of transmitting vision, i. e., of transmitting images successively and with a time interval between successive images not substantially greater than the time of persistence of optical vision, a modulating shutter for modulating the intensity of the illumination of elements of the transmitted vision, consisting of a plurality of relatively movable thin flexible elements actuated by the vision modulated currents transmitted from the sending end, said elements being relatively arranged and operating in their relative movements for a light transmitting action which is a multiple valued function of the current at any time.

8. In the art of transmitting vision, i. e., of transmitting images successively and with a time interval between successive images not substantially greater than the time of persistence of optical vision, a modulating shutter for modulating the intensity of the illumination of elements of the transmitted vision, consisting of a thin flexible metallic strip actuated by the vision modulated currents transmitted from the sending end, and electrical means, independent of the vision modulated currents, for governing the amplitude of motion of said strip.

9. In the art of transmitting vision, i. e., of transmitting images successively and with a time interval between successive images not substantially greater than the time of persistence of optical vision, a modulating shutter for modulating the intensity of illumination of elements of the transmitted vision, consisting of a plurality of parallel relatively movable conducting wires vibrated by the vision modulated currents transmitted from the sending end, and electrical means, independent of said currents, for governing the amplitude of motion of the wires.

10. In the art of transmitting vision, i. e., of transmitting images successively and with a time interval between successive images not substantially greater than the time of persistence of optical vision, a light modulating device at the receiving end, operable by the vision modulated currents transmitted from the sending end, consisting of a highly attenuated linear vibratory element of a mass proportionate to its ratio of current carrying capacity such as adapts it to have a vibration frequency of the order of one hundred thousand (100,000) or more per second of time.

11. In an electroscenic system for transmitting vision, i. e., for transmitting images successively and with a time interval between successive images not substantially greater than the time of persistence of optical vision from one point to a distant point, a modulating device at the receiving point, operable by vision modulated currents transmitted from the sending point, consisting of a thin strip of a diameter substantially one ten thousandth of an inch, or less, and of a mass proportionate to its ratio of current carrying capacity such as adapts it to have a vibration frequency of the order of one hundred thousand (100,000) or more per second of time.

12. An electric impulse actuated opening and closing mechanism in the art of transmitting vision, i. e., transmitting images successively and with a time interval between successive images not substantially greater than the time of persistence of optical vision having its indication a multiple valued function of the intensity of the received actuating impulses.

13. In television, i. e., transmitting images successively and with a time interval between successive images not substantially greater than the time of persistence of optical vision, a light modulating device at the receiving end operable by the vision modulated currents transmitted from the sending end consisting of, as a moving element, a thin conducting strip having the ratio of its current carrying capacity to its mass per unit length abnormally increased by attenuation of its diameter to substantially one ten thousandth of an inch, or less, whereby it is operable by the actuating impulses substantially one hundred thousand (100,000) times per second, or more.

REGINALD A. FESSENDEN.